United States Patent [19]

Laviano

[11] 3,983,904

[45] Oct. 5, 1976

[54] PLUG ASSEMBLY FOR SEALING A PIPE

[76] Inventor: Louis R. Laviano, 15 Chestnut Lane, Levittown, N.Y. 11756

[22] Filed: Mar. 13, 1975

[21] Appl. No.: 558,169

[52] U.S. Cl. ............................ 138/89; 138/90
[51] Int. Cl.² ............................ F16L 55/10
[58] Field of Search .......... 138/89, 91, 94.3, 96 T, 138/90, 96 R, 97; 285/121, 242

[56] References Cited
UNITED STATES PATENTS

| | | | |
|---|---|---|---|
| 1,050,557 | 1/1913 | McLaughlin | 138/89 X |
| 1,644,118 | 10/1927 | Florence | 138/90 |
| 1,850,040 | 3/1932 | Turner | 138/89 |
| 1,993,307 | 3/1935 | Nicholson | 138/89 |
| 2,428,381 | 10/1947 | Parry | 285/121 X |
| 2,445,273 | 7/1948 | Kennedy | 138/97 |
| 2,855,003 | 10/1958 | Thaxton | 138/90 |
| 2,937,666 | 5/1960 | Maisch | 138/89 |
| 3,020,929 | 2/1962 | Knecht | 138/89 |
| 3,550,636 | 12/1970 | Hearne | 138/89 |

Primary Examiner—Richard E. Aegerter
Assistant Examiner—Larry Jones
Attorney, Agent, or Firm—Edward H. Loveman

[57] ABSTRACT

A plug assembly for fluid sealing a pipe includes a cylindrical plug made of pliable material which has a conical bore defining a cylindrical wall of tapering thickness. A threaded bore or stud extends axially of the bore and has a nut rotatable mounted thereon. A spherical or conical drive member carried by the bolt contacts and expands the tapered wall of the plug when the nut is tightered on the bolt. The nut may bear against the drive member or one end of the plug. The bolt may be prevented from rotating when the nut is tightened, by shaping one end of the bolt to engage a wrench, or by locking the other end of the bolt in the plug and providing gripping means on the plug arranged to engage the inside of the pipe.

7 Claims, 10 Drawing Figures

PLUG ASSEMBLY FOR SEALING A PIPE

This invention relates to expansion devices for sealing pipes, and more particularly concerns an expansion plug assembly which hermetically seals a pipe in which it is installed.

Expansion bolts and plugs of various types have heretofore been proposed which employ rubber to seal pipes and tubes. When such devices are used in pipes conveying fuel gas, they have a limited life due to deterioration of the rubber exposed to the gas. Another objection to the prior expansion plugs is the ease of removal of the plugs by unauthorized persons.

The present invention is directed at an expansion plug assembly containing a pliable hollow cylindrical plug which has a conical bore which may be expanded under pressure to seal a pipe in which it is installed. A solid, inflexible tapered or spherical member may be pulled or pushed into the conical bore to expand the walls of the plug thereby completely sealing the inside of the pipe. The tapered member may be moved by advancing a nut upon a threaded stud or bolt extending axially through the assembly. The bolt is kept from turning by an externally applied tool, or by spring loaded prongs on the plug, which engage the inner wall of the pipe. Once the plug assembly is installed, it cannot be removed by simple application of a wrench or screwdriver as in prior expansion plugs. Removal may be accomplished by cutting of the end of the pipe in which the assembly is installed. Such an operation requires special tools and considerable skill. Thus the sealed pipe is secured against ordinary tampering and accidental loosening.

These and other objects and many attendant advantages of this invention will be readily appreciated as the same becomes better understood by reference to the following detailed description when considered in connection with the accompanying drawings in which.

Figure 1:
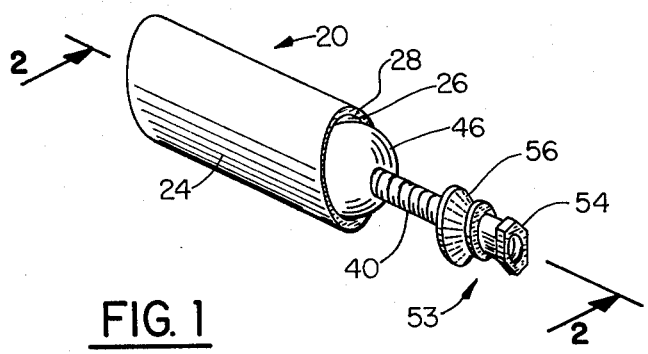
FIG. 1 is a perspective view of a plug assembly embodying the present invention.
Figure 3:
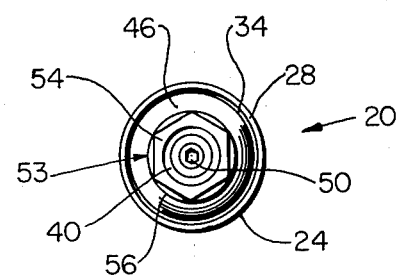
FIG. 3 is an enlarged view taken along line 3—3 of FIG. 2.

Referring now to the drawings wherein like reference characters designate like or corresponding parts throughout, there is illustrated in FIGS. 1-4, a plug assembly generally designated as reference numeral 20, for a pipe 22. The assembly 20 includes a cylindrical plug 24 which has a conical inner bore 26 extending axially inward from the one open end 28 of the plug 24. The bore 26 communicates with an axial unthreaded bore 30 formed in the other closed end 32 of the plug 24. The walls 34 of the plug 24 surrounding the conical bore 26 are tapered in thickness toward an end 35 of the conical bore 26, with the thinnest portions of the wall 34 at the open end 28 of the plug 24. The plug 24 is preferably made of pliable material such as a plastic or a malleable metal such as lead, copper, aluminum or a malleable alloy thereof.

A solid steel bolt 40 extends axially of the plug 24 and has a head 42 which abuts a flat end 44 of the plug 24. A rigid, solid ball 46 having a diametral hole 48 is mounted on the bolt 40 which extends outward of the open end 28 of the plug 24. The ball 46 fits part way into the conical bore 26 in the plug 24. The outermost end of the bolt 40 is formed with a hexagonal socket 50 into which may be engaged the end of a wrench 52 for holding the bolt 40. The wrench 52 is shown in dotted lines in FIG. 2.

An elongated nut 53 having a hexagonal end 54 is mounted on the bolt 40. The end 54 of the nut 53 may be engaged by a wrench nut (not illustrated) for turning the nut 53. A flared end portion 56 of the nut 53 may bear against the ball 46 when the nut 53 is rotated on the bolt 40.

Figure 2:
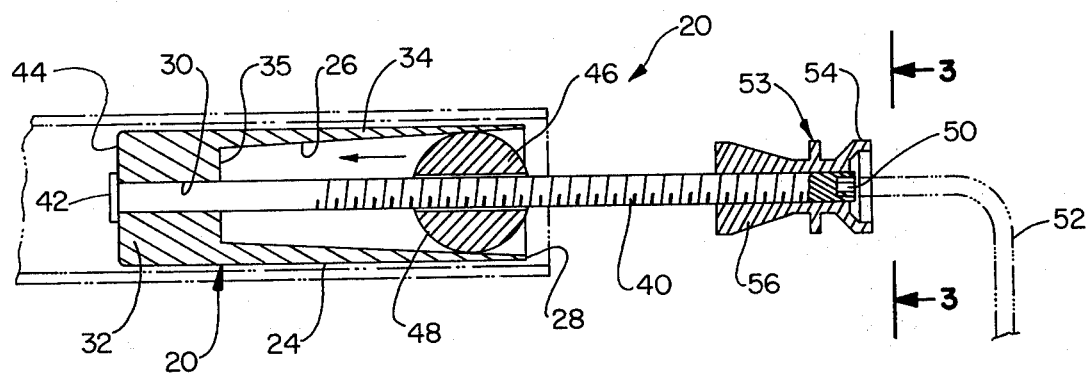
FIG. 2 is an enlarged central sectional view taken along line 2—2 of FIG. 1.
Figure 4:
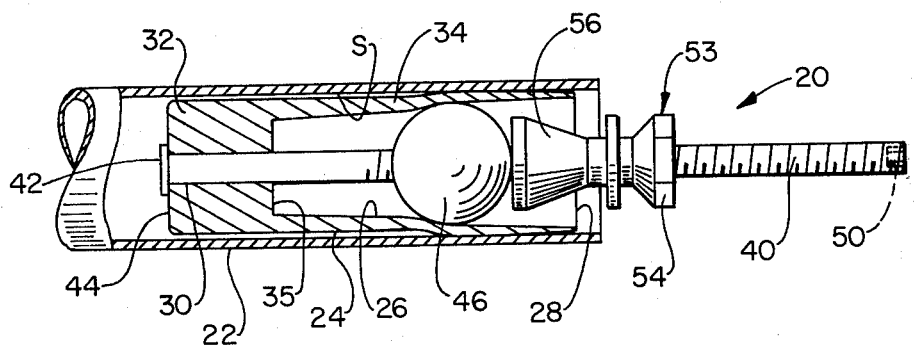
FIG. 4 is a sectional view similar to FIG. 1 showing the plug assembly installed in the end of a pipe.
Figure 5:
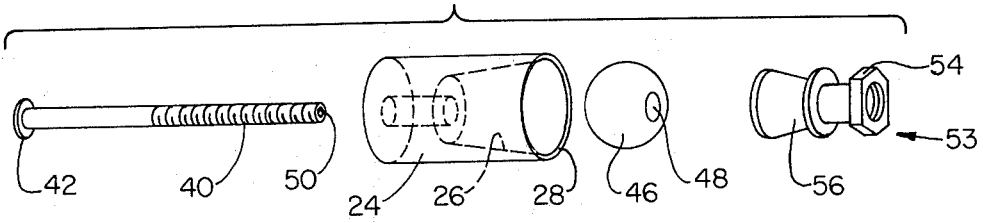
FIG. 5 is a reduced exploded perspective view of parts of the plug assembly of FIGS. 1-4.
Figure 6:
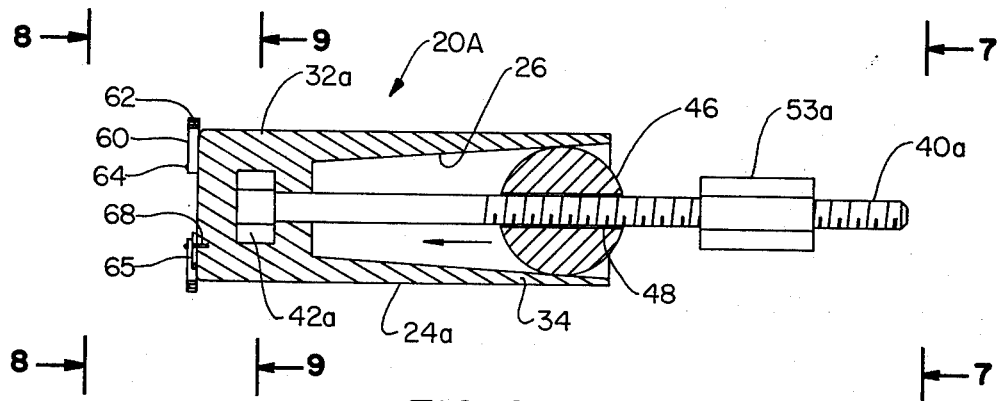
FIG. 6 is a central sectional view of another plug assembly embodying a modification of the invention.
Figure 7:
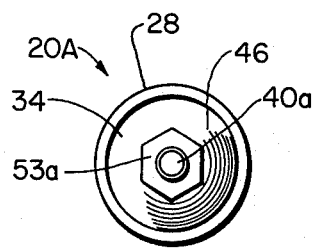
FIG. 7 is an end view of one end of the plug assembly of FIG. 6 taken along lines 7—7.
Figure 8:
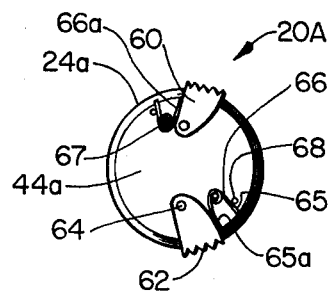
FIG. 8 is an end view of the other end of the plug assembly of FIG. 6 taken along lines 8—8.
Figure 9:
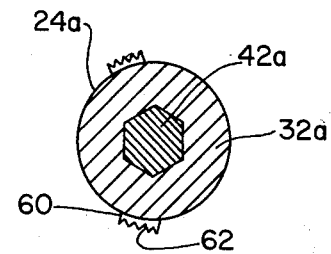
FIG. 9 is a cross sectional view taken along line 9—9 of FIG. 6.

In operation of the plug assembly 20, the closed end 32 of the plug 24 is inserted into the end of the pipe 22, illustrated in dotted lines in FIG. 2 and in solid lines in FIG. 4. The wrench 52 is inserted into the socket 50 to prevent the bolt 40 from turning. Another wrench (not shown) is then applied to the nut 53 which is turned until it contacts the ball 46. Forcible turning of the nut 53 now forces the ball 46 into the plug 24 deforming and expanding the walls 34 until they conform with the inner surfaces S of the pipe 22. This forms a hermetic seal which is permanent and cannot be accidentally shaken loose.

The plug assembly 20 has particular utility in sealing a gas supply pipe leading to gas applicances at the premises of a gas consumer. It may be easily and quickly installed and requires no special skill.

FIGS. 6–9 show another plug assembly 20A in which a head 42a of a bolt 40a is embedded in a body or end portion 32a of a plug 24a. A hexagonal nut 53a is engaged on a bolt 40a. On an end 44a of the plug 24a is a pair of outwardly extending prongs 60 having a plurality of teeth 62 at their outer ends and each of the prongs 60 pivot on a respective pin 64. One arm 65 of a leaf spring 66 and 66a is held by a respective pin 68 and the other arm 65a of the spring 66 and 66a contacts the edges of one of the prongs 60 to bias it outwardly of the plug 24a. The springs 66 and 66a are adapted to be secured to the plug 24a by a pin 67.

In operation of the plug assembly 20A, the plug 24a is fitted into the end of the pipe 22 with the prongs 60 engaging the inner wall surface of the pipe 22. The nut 53a is turned by a wrench until it contacts the ball 46. The prongs 60 which engage the inner walls of the pipe 22 prevents the assembly 20A from turning when the nut 53a is turned and the ball 46 is forced into the bore 26. The expansion and deformation of the walls 34 of the plug 22a form a complete hermetic seal in the pipe 22 similarly as illustrated in FIG. 4.

Figure 10:
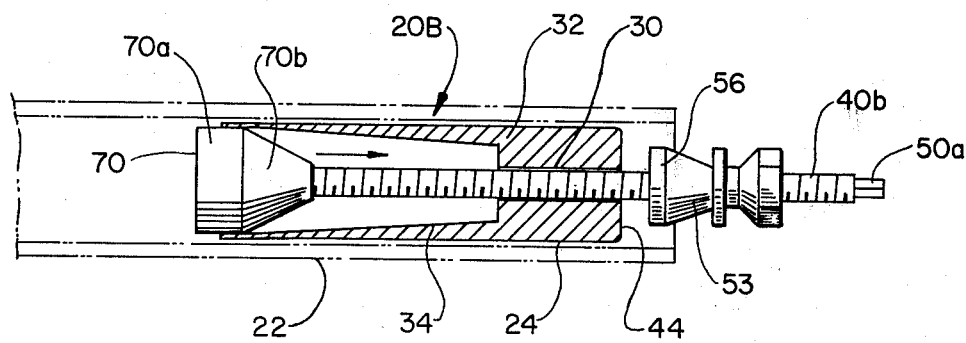
FIG. 10 is a central sectional view of still another plug assembly embodying a further modification of the invention.

FIG. 10 shows another plug assembly 20B in which a rigid drive member 70 is secured to one end of a bolt 40b. The drive member 70 has a tapered surface 70b and a cylindrical surface 70a which is adapted to engage the bore 26 of the plug 24b. The other end of the bolt 40b may have a conventional hexagonally sided bore for engagement by a wrench 50a to prevent the bolt 40b from turning. The nut 53 is engaged on the bolt 40b. In this assembly 20b, the nut 53 bears against the end 44 of the plug 24 and serves to pull the member 70 axially outward of the pipe 22 when the nut 53 is rotated clockwise. The surfaces 70a of the drive member 70 expand the tapered walls 34 of the plug 24b to seal the inner surface of the pipe 22. Although not shown, the drive member 70 is centrally drilled and taped axially through only a portion thereof to prevent leakage therethrough.

In all forms of the invention, the plug 24 assembly assumes a permanently deformed and expanded configuration. Subsequent loosening of the nut 53 or 53a cannot loosen the expanded plug 24. Thus the installed assembly is secure against the tampering or accidental displacement and leakage. It should be understood that although a bolt with a head has been illustrated in all of the figures, the bolt may take the form of a stud having a straight shank. If desired, the stud may be threaded throughout its length. As an example, in FIG. 6, the bolt 40a, may have a straight shank and not have a head 42a.

It should be understood that the foregoing relates to only a limited number of preferred embodiments of the invention, which have been by way of example only and that it is intended to cover all changes and modifications of the examples of the invention which do not constitute departures from the spirit and scope of the invention.

The invention claimed is:

1. A plug assembly for sealing a pipe, comprising:
 a cylindrical plug insertable axially in a pipe said plug having a conical bore extending from intermediate the ends of said plug to one end of said plug thereby defining a cylindrical wall of tapering thickness which is thinnest at said one end of said plug;
 a threaded member extending axially through said conical bore;
 a nut rotatably mounted on said threaded member;
 means for preventing said threaded member from rotating when said nut is rotated; and
 a rigid spherically shaped drive means carried by said threaded member and arranged to contact and expand said tapered wall of said plug, when said nut is rotated and moves axially thereby axially moving said drive means whereby the expanded wall seals the inside of said pipe.

2. A plug assembly as defined in claim 1, wherein said means for preventing said threaded member from rotating when said nut is rotated comprises an end portion of said threaded member shaped for engaging a wrench.

3. A plug assembly as defined in claim 1, wherein said cylindrical plug is made of a pliable material which retains its expanded form and seals said pipe even though said nut is moved away from said drive means.

4. A plug assembly as defined in claim 3, wherein said means for preventing said bolt from rotating when said nut is rotated comprises an end portion of said threaded member locked in a section of said plug adjacent to said conical bore.

5. A plug assembly as defined in claim 3, wherein said means for preventing said threaded member from rotating when said nut is rotated comprises a gripping means on the other end of said plug arranged to engage the inside of said pipe.

6. A plug assembly as defined in claim 3, wherein said means for preventing said threaded member from rotating when said nut is rotated comprises an end portion of said threaded member locked in a section of said plug adjacent to said conical bore, and having a gripping means on the other end of said plug arranged to engage the inside of said pipe.

7. A plug assembly as defined in claim 3, wherein said drive means is spherical and disposed adjacent said nut for contact thereby when the said nut is rotated to bear against said drive means and wherein said means for preventing said bolt from rotating comprises an end portion of said threaded member shaped for engaging a wrench.

* * * * *